United States Patent
Jang

(10) Patent No.: US 10,805,100 B2
(45) Date of Patent: Oct. 13, 2020

(54) METHOD AND SYSTEM FOR SORTING CHATROOM LIST BASED ON CONVERSATIONAL ACTIVENESS AND CONTEXTUAL INFORMATION

(71) Applicant: LINE Corporation, Shinjuku-Ku, Tokyo (JP)

(72) Inventor: Hyukjae Jang, Seongnam-si (KR)

(73) Assignee: LINE Corporation, Tokyo (JP)

( * ) Notice: Subject to any disclaimer, the term of this patent is extended or adjusted under 35 U.S.C. 154(b) by 3 days.

(21) Appl. No.: 15/994,156

(22) Filed: May 31, 2018

(65) Prior Publication Data
US 2018/0367325 A1 Dec. 20, 2018

(30) Foreign Application Priority Data

Jun. 16, 2017 (KR) .......................... 10-2017-0076613

(51) Int. Cl.
*G06F 15/16* (2006.01)
*H04L 12/18* (2006.01)
(Continued)

(52) U.S. Cl.
CPC .......... *H04L 12/1813* (2013.01); *H04L 51/16* (2013.01); *H04L 51/20* (2013.01); *H04L 67/306* (2013.01)

(58) Field of Classification Search
CPC .............. G06F 16/9535; G06F 3/0482; G06F 17/2785; G06F 3/04842; G06F 16/951;
(Continued)

(56) References Cited

U.S. PATENT DOCUMENTS

2003/0195928 A1* 10/2003 Kamijo ............... H04L 12/1818
709/204
2012/0030293 A1* 2/2012 Bobotek ................ G06Q 10/10
709/206
(Continued)

FOREIGN PATENT DOCUMENTS

| JP | 2004-226633 A | 8/2004 |
| KR | 10-2002-0074304 A | 9/2002 |
| KR | 10-2014-0120982 A | 10/2014 |

OTHER PUBLICATIONS

Seeon. "Strenghtens user ties with 'Theme Chat.'" Internet article published Sep. 24, 2014. http://news.naver.com/main/read.nhn?mode=LPOD&mid=etc&oid=020&aid=0002654182 (Korean with English translation).
(Continued)

*Primary Examiner* — Michael A Keller
*Assistant Examiner* — Thao D Duong
(74) *Attorney, Agent, or Firm* — Harness, Dickey & Pierce, P.L.C.

(57) ABSTRACT

The chatroom sorting method including recognizing contextual information associated with an event detection point in time and storing the recognized contextual information in association with a conversation related event in response to detecting the conversation related event with respect to each of chatrooms included in a chatroom list, calculating at least one of an activeness score associated with a participation of a user into a conversation for each of the plurality of chatrooms and a similarity score between a situation at a current point in time and the contextual information, and sorting at least a portion of the chatrooms included in the chatroom list based on at least one of the activeness score and the similarity score such that selected one or more chatrooms from among the chatrooms are placed on top of
(Continued)

the chatroom list based on results of the sorting may be provided.

21 Claims, 10 Drawing Sheets

(51) Int. Cl.
*H04L 12/58* (2006.01)
*H04L 29/08* (2006.01)

(58) Field of Classification Search
CPC .. G06F 16/958; G06F 17/2705; G06F 17/274; H04L 51/32; H04L 67/306; H04L 51/02; H04L 51/046; H04L 51/10
See application file for complete search history.

(56) References Cited

U.S. PATENT DOCUMENTS

| | | | |
|---|---|---|---|
| 2013/0169742 A1* | 7/2013 | Wu | H04N 7/147 348/14.08 |
| 2016/0055845 A1* | 2/2016 | Ikawa | G10L 15/063 704/202 |
| 2017/0093780 A1* | 3/2017 | Lieb | G06T 3/40 |
| 2018/0218734 A1* | 8/2018 | Somech | G10L 15/16 |

OTHER PUBLICATIONS

Cacao Apps. "KakaoTalk Dialogue Analyzer application and how to make an application."
Seeon "Strengthens User Bonding with 'Theme Chat'" Internet article published Sep. 24, 2014 it.donga.com/19307/.
Korean Office Action dated Jan. 23, 2020 issued in corresponding Korean Application No. 10-2018-0122970.

* cited by examiner

100

METHOD AND SYSTEM FOR SORTING CHATROOM LIST BASED ON CONVERSATIONAL ACTIVENESS AND CONTEXTUAL INFORMATION

CROSS-REFERENCE TO RELATED APPLICATION(S)

This application claims priority under 35 U.S.C. § 119 to Korean Patent Application No. 10-2017-0076613 filed on Jun. 16, 2017, in the Korean Intellectual Property Office (KIPO), the entire contents of which are incorporated herein by reference.

BACKGROUND

Field

One or more example embodiments relate to methods and/or systems for sorting chatrooms.

Description of Related Art

An instant messenger is a communication tool, and refers to a software program or application capable of transmitting and receiving messages or data in real time. Through the instant messenger, a user may register a contact and may transmit and receive messages to and from a counterpart user included in a contact list.

Such a messenger function is common in a mobile environment of a mobile communication terminal as well as a personal computer (PC). For example, a mobile messenger service system and a method of a mobile terminal using a wireless communication network to provide a messenger service between mobile messengers installed on the mobile terminal are disclosed in Korean Patent Laid-Open Publication NO. 10-2002-0074304.

For example, a method of sorting chatrooms on a messenger uses simple conditions such as a time at which a recent message is received, a number of unread messages, and whether favorite is set.

To retrieve a specific chatroom, a user needs to retrieve the specific chatroom from a search result by directly inputting a keyword into a chatroom list or may need to retrieve the specific chatroom using a scroll function. In the latter case, the user may experience inconvenience if a number of chatrooms is increased.

The user may fix the specific chatroom at an upper end of the chatroom list using a favorite setting function or a pin setting function. In this case, the user needs to directly set specific chatrooms one by one.

SUMMARY

One or more example embodiments provide methods and/or systems that may automatically sort chatrooms based on a user activeness in a corresponding chatroom and contextual information associated with an action of a user.

According to an aspect of at least one example embodiment, there is provided a computer-implemented chatroom sorting method including recognizing, by one or more processors, contextual information associated with an event detection point in time and storing the recognized contextual information in association with a conversation related event in response to detecting the conversation related event with respect to each of chatrooms included in a chatroom list, the event detection point in time at which the conversation related event is detected, calculating, by the one or more processors, at least one of an activeness score associated with a participation of a user into a conversation for each chatroom and a similarity score between a situation at a current point in time and the contextual information, and sorting, by the one or more processors, at least a portion of the chatrooms included in the chatroom list based on at least one of the activeness score and the similarity score such that selected one or more chatrooms from among the chatrooms are placed on top of the chatroom list based on results of the sorting.

The storing may include storing contextual information that includes at least one of location information and time information at the event detection point in time.

The storing may include constructing a chatroom timetable and a location timetable, the chatroom timetable configured to store chatroom information, associated with the detected conversation related event in temporal order, the location timetable configured to store location information of the user in temporal order as the contextual information.

The calculating may include calculating the activeness score using at least one of a ratio of a number of conversations of the user to a total number of conversations in a corresponding chatroom, a ratio of the number of conversations of the user in the corresponding chatroom to a total number of conversations of the user in the chatrooms, and a ratio of a number of times a speaker is changed to a total number of conversations in the corresponding chatroom.

The calculating may include calculating the activeness score using at least one of a number of times the user has started a conversation after a last conversation in a corresponding chatroom, a number of times multimedia content has been transmitted and received in the corresponding chatroom, and a ratio of a number of days with conversations to a total number of days elapsed after a creation of the corresponding chatroom.

The calculating may include calculating the similarity score using a conversation history which includes the contextual information corresponding to the situation at the current point in time for each chatroom.

The calculating may include calculating the similarity score using at least one of a ratio of a number of conversations of the user to a total number of conversations in a corresponding chatroom that are made at a time corresponding to the situation at the current point in time and a ratio of the number of conversations of the user in the corresponding chatroom to a total number of conversations of the user in the chatrooms that are made at the time corresponding to the situation at the current point in time.

The calculating may include calculating the similarity score using at least one of a ratio of a number of conversations of the user to a total number of conversations in a corresponding chatroom that are made in a place corresponding to the situation at the current point in time and a ratio of the number of conversations of the user in the corresponding chatroom to a total number of conversations of the user in the chatrooms that are made in the place corresponding to the situation at the current point in time.

The sorting may include selecting a desired number of chatrooms from among the chatrooms based on at least one of the activeness score and the similarity score and placing the selected desired number of chatrooms on a top of the chatroom list.

The sorting may include calculating probability scores for respective ones of the chatrooms using at least one of the activeness score and the similarity score, selecting N chatrooms from among the chatrooms based on a difference in the probability score between the chatrooms, and placing the N chatrooms on the top of the chatroom list and displaying remaining chatrooms excluding the N chatrooms from among the entire chatrooms based on an existing sorting criterion.

According to an aspect of at least one example embodiment, there is provided a non-transitory computer-readable recording medium storing instructions that, when executed by a processor, cause the processor to perform a chatroom sorting method including recognizing contextual information associated with an event detection point in time and storing the recognized contextual information in association with a conversation related event in response to detecting the conversation related event with respect to each of the plurality of chatrooms included in a chatroom list, the event detection point in time at which the conversation related event is detected, calculating at least one of an activeness score associated with a participation of a user into a conversation for each chatroom and a similarity score between a situation at a current point in time and the contextual information, and sorting at least a portion of the chatrooms included in the chatroom list based on at least one of the activeness score and the similarity score such that selected one or more chatrooms from among the chatrooms are placed on top of the chatroom list based on results of the sorting.

According to an aspect of at least one example embodiment, there is provided a computer-implemented chatroom sorting system including at least one processor configured to execute computer-readable instructions. The at least one processor is configured to recognize contextual information associated with an event detection point in time and store the recognized contextual information in association with a conversation related event in response to detecting the conversation related event with respect to each of chatrooms included in a chatroom list, the event detection point in time at which the conversation related event is detected, calculate at least one of an activeness score associated with a participation of a user into a conversation for each of a plurality of chatrooms and a similarity score between a situation at a current point in time and the contextual information, and sort at least a portion of the chatrooms included in the chatroom list based on at least one of the activeness score and the similarity score such that selected one or more chatrooms from among the chatrooms are placed on top of the chatroom list based on results of the sorting.

According to some example embodiments, because chatrooms are automatically sorted based on a user activeness in a corresponding chatroom and contextual information associated with an action of a user, a chatroom that is actively used by the user or is highly likely to be used by the user based on a time and/or a place may be automatically displayed at an upper end (e.g., top portion) of a chatroom list. Thus, the user may easily and conveniently retrieve a desired chatroom and perform chatting.

Further areas of applicability will become apparent from the description provided herein. The description and specific examples in this summary are intended for purposes of illustration only, and are not intended to limit the scope of the present disclosure.

BRIEF DESCRIPTION OF THE FIGURES

Example embodiments will be described in more detail with regard to the figures, wherein like reference numerals refer to like parts throughout the various figures unless otherwise specified, and wherein.

Figure 1:
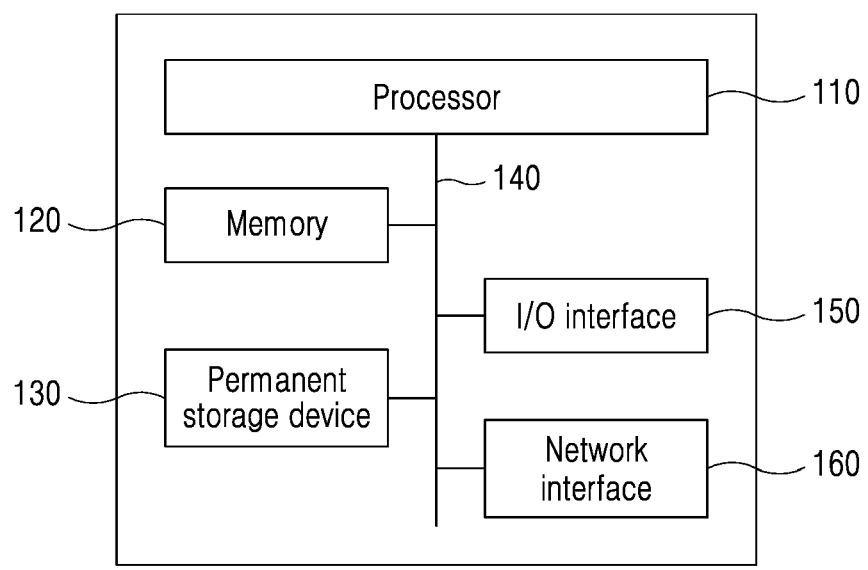
FIG. 1 is a diagram illustrating an example of a configuration of a computer system according to at least one example embodiment.

It should be noted that these figures are intended to illustrate the general characteristics of methods and/or structure utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," or "upper" may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, or circuit may be connected or combined to be different from the above-described methods, or results may be appropriately achieved by other components or equivalents.

Hereinafter, example embodiments will be described with reference to the accompanying drawings.

The example embodiments relate to a technique for sorting chatrooms, and more particularly, to a method and system for automatically sorting chatrooms based on a user activeness in a corresponding chatroom and contextual information associated with an action of a user.

The example embodiments disclosed herein may sort chatrooms based on a user activeness and may achieve many advantages in terms of efficiency, convenience, readiness, cost saving, and the like.

The term "chatroom" used herein may indicate an interface screen for displaying messages transmitted and received between users. For example, an interface screen for displaying messages transmitted and received through a communication session established between accounts of users on a messenger. A representative example may include an interface screen for displaying messages transmitted and received with a counterpart of a corresponding phone number using a text function in a short message service (SMS) or a multimedia message service (MMS). In a messenger service, a chatroom is created based on a communication session established between accounts. In a text function, a chatroom is created based on a telephone number. The functions may provide a list of all of the created chatrooms that are sorted based on a predetermined criterion.

Although a chatroom sorting method of a messenger is described herein as an example, it is provided as an example only. The example embodiments may be applied to the text function such as an SMS or an MMS and to any type of objects that are created using a conversation related interface and are to be sorted.

FIG. 1 is a diagram illustrating an example of a configuration of a computer system according to at least one example embodiment. For example, a chatroom sorting system according to the example embodiments may be configured through a computer system 100 of FIG. 1. Referring to FIG. 1, the computer system 100 may include a processor 110, a memory 120, a permanent storage device 130, a bus 140, and an input/output (I/O) interface 150, and a network interface 160.

The processor 110 may include a device capable of processing a sequence of instructions or may be a part thereof. The processor 110 may include, for example, a computer processor, a processor within a mobile device or another electronic device, and/or a digital processor. The processor 110 may be included in, for example, a server computing device, a server computer, a series of server computers, server farm, a cloud computer, a content platform, a mobile computing device, a smartphone, a tablet, or a set-top box. The processor 110 may be connected to the memory 120 through the bus 140.

The memory 120 may include a volatile memory, a permanent memory, a virtual memory, and/or other types of memories that may store information used by the computer system 100 or output from the computer system 100. The memory 120 may include, for example, random access memory (RAM) and/or dynamic RAM (DRAM). The memory 120 may be used to store information such as state information of the computer system 100. The memory 120 may be used to store instructions of the computer system 100 including instructions for controlling a face recognition camera. The computer system 100 may include one or more processors 110 if necessary or appropriate.

The bus 140 may include a communication-based structure that enables interaction between various components of the computer system 100. The bus 140 may convey data between the components of the computer system 100, for example, between the processor 110 and the memory 120. The bus 140 may include wireless and/or wired communication media between the components of the computer system 100 and may include parallel, serial, or other topology arrangements.

The permanent storage device 130 may include components, such as a memory or another permanent storage device, used by the computer system 100 to store data during an extended period (e.g., compared to that of the memory 120). The permanent storage device 130 may include a non-volatile main memory such as used by the processor 110 included in the computer system 100. The permanent storage device 130 may include, for example, flash memory, hard disk, optical disk, or other computer-readable media.

The I/O interface 150 may include a keyboard, a mouse, a voice command input, a display, and/or interfaces associated with input or output devices. Configuration instructions and/or input associated with a face recognition camera may be received through the I/O interface 150.

The network interface 160 may include one or more interfaces associated with networks, such as the Internet or near field networks. The network interface 160 may include interfaces associated with wired or wireless connections. The configuration instructions may be received through the network interface 160. Information associated with the face recognition camera may be received or transmitted through the network interface 160.

According to other example embodiments, the computer system 100 may include components greater than the number of components shown in FIG. 1. However, there is no need to clearly illustrate many components according to the related art. For example, the computer system 100 may be configured to include at least a portion of I/O devices connected to the I/O interface 150 or to further include other components, such as a transceiver, a global positioning system (GPS) module, a camera, various sensors, and/or a database. For example, if the computer system 100 is configured in a form of a mobile device (e.g., a smartphone), the computer system 100 may be configured to further include various components, for example, a camera, an acceleration sensor or a gyro sensor, various types of physical buttons, a button using a touch panel, an I/O port, and/or a vibrator for vibration, which are included in the mobile device.

Some example embodiments may automatically sort chatrooms based on an activeness of a user in a corresponding chatroom and/or a similarity between contextual information associated with an action of the user in the chatroom and current contextual information of the user. An example of a technical scenario for this follows as:

(1) In response to detecting a conversation related event (e.g., a message transmission and reception, and/or a multimedia content transmission and reception with respect to each chatroom, contextual information that includes a current location or a time of an event detection point in time may be recognized and stored in association with the corresponding event.

(2) An activeness score of a user for each chatroom may be calculated and stored through connection to a conversation database that stores conversation details on a messenger.

(3) If chatrooms need to be sorted, (3-1) a similarity score between current contextual information of the user and a previous event situation is calculated for each chatroom and (3-2) an activeness score stored for each chatroom is read.

(4) A desired number of chatrooms are selected based on the activeness score and the similarity score of each chatroom and are sorted on a top of a chatroom list.

Figure 2:
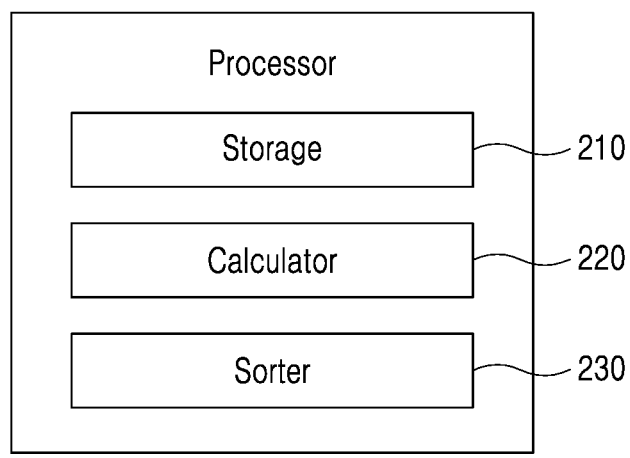
FIG. 2 is a block diagram illustrating an example of constituent elements includable in a processor of a computer system according to at least one example embodiment.
Figure 3:
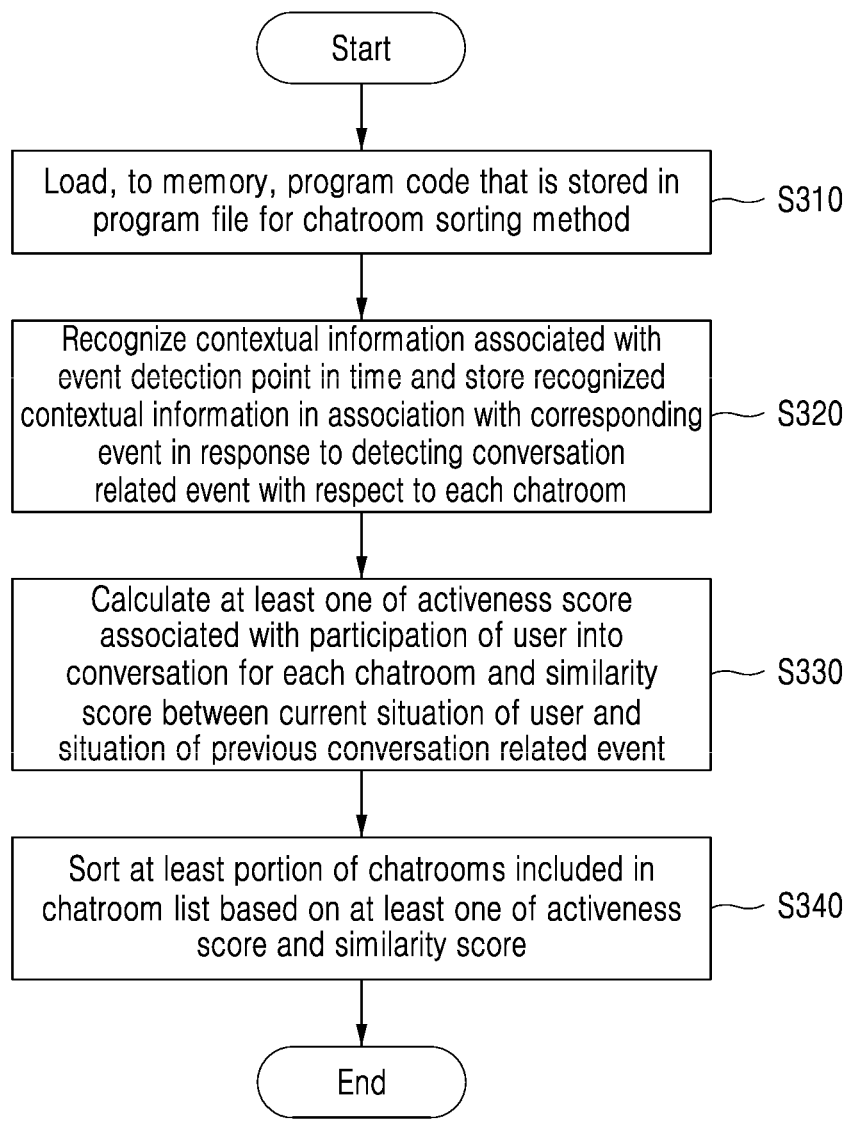
FIG. 3 is a flowchart illustrating an example of a chatroom sorting method performed by a computer system according to at least one example embodiment.

FIG. 2 is a diagram illustrating an example of components includable in a processor of a computer system according to at least one example embodiment and FIG. 3 is a flowchart illustrating an example of a chatroom sorting method performed by a computer system according to at least one example embodiment.

Referring to FIG. 2, the processor 110 may include a storage 210, a calculator 220, and a sorter 230. The components of the processor 110 may be representations of different functions that are performed by the processor 110 in response to a control instruction from at least one program code. For example, the storage 210 may be used as a functional representation of the processor 110 controlling the computer system 110 to store contextual information in association with a conversation related event. The processor 110 or the components of the processor 110 may perform operations S310 through S340 included in the chatroom sorting method of FIG. 3. For example, the processor 110 or the components of the processor 110 may be configured to execute instructions according to at least one program code and/or a code of an OS included in the memory 120. Here, at least one program code may correspond to a code of a program configured to process the chatroom sorting method.

The chatroom sorting method may not be implemented in illustrated sequence and/or a portion of operations included in the chatroom sorting method may be omitted. In some example embodiments, an additional process may be further included in the chatroom sorting method.

Referring to FIG. 3, in operation S310, the processor 110 may load a program code that is stored in a program file for the chatroom sorting method to the memory 120. For example, the program file for the chatroom sorting method may be stored in the permanent storage device 130 of FIG. 1. The processor 110 may control the computer system 100 so that the program code may be loaded from the program file stored in the permanent storage device 130 to the memory 120 through the bus 140. Here, the processor 110 and the storage 210, the calculator 220, and the sorter 230 included in the processor 110 may be different functional representations of the processor 110 to perform operations S320 through S340 by executing an instruction of a portion of the instructions corresponding to the program code loaded to the memory 120. To perform operations S320 through S340, the processor 110 and the components of the processor 110 may directly process an operation in response to the control instruction or may control the computer system 100.

In operation S320, in response to detecting a conversation related event with respect to each chatroom on a messenger, the storage 210 may recognize contextual information associated with an event detection point in time and may store the recognized contextual information in association with the corresponding conversation related event. Here, the conversation related event may refer to any type of events that are triggered in response to transmitting and receiving a variety of data, for example, messages or multimedia contents (e.g., a stamp, a sticker, Emoji, a photo, an image, or a moving picture). In addition, the contextual information may include time information associated with a point in time at which the conversation related event has occurred, and/or location information acquirable at the computer system 100 at the point in time at which the conversation related event has occurred. The location information may include, for example, longitudinal/latitudinal information using a global positioning system (GPS), or place information using network access information (e.g., wireless fidelity (WiFi) access point (AP) information). The storage 210 may store contextual information including a location or a time at a point in time at which the conversation related event is detected as contextual information associated with a situation in which the user acts in each chatroom in association with the corresponding conversation related event.

In operation S330, the calculator 220 may calculate at least one of an activeness score associated with a participation of the user into a conversation for each chatroom and a similarity score between a current situation of the user and a situation of a previous conversation related event. Here, the calculator 220 may calculate the activeness score by measuring an activeness according to the participation of the user into the conversation and calculating the activeness as a score for each chatroom by referring to a conversation database that stores conversation details on the messenger. An example of the activeness relates to a number of conversations of the user or a number of visitations of the user in a chatroom, and may be calculated using, for example, a ratio of a number of conversations of the user to a total number of conversation in the chatroom and/or a ratio of the number of conversations of the user in the chatroom to a total number of conversations of the user in the entire chatrooms. Another example of the activeness relates to a number of times the user has started a conversation, and may be calculated using, for example, a number of times the user has started a new conversation after a desired period of time is elapsed after a last conversation. As another example of the activeness, features regarding a level of equality at which conversations are made between the user and a counterpart user not a unilateral conversation from a user side, a level of usage of multimedia content (e.g., a stamp, a sticker, a photo, and/or a moving picture), or a level of seamless continuity of conversations may be calculated as a score. The calculator 220 may compare current contextual information of the user including a current location and/or a current time corresponding to a point in time at which chatrooms need to be sorted to contextual information of a point in time at which the previous conversation related event has occurred, and may calculate a similarity therebetween as a score for each chatroom. In the case of calculating the activeness score for each chatroom and the similarity score using contextual information, a relatively small weight may be applied to a score of a previous conversation history or the previous conversation related event as time passes. That is, the activeness score for each chatroom and the similarity score using contextual information may decrease as time passes from a most recent conversation time.

In operation S340, the sorter 230 may sort at least a portion of chatrooms included in the chatroom list based on at least one of the activeness score and the similarity score. The sorter 230 may calculate a probability score, which is a probability score that the user is currently to use a corresponding chatroom, for each chatroom based on at least one of the activeness score and contextual information, and may sort the chatroom list based on probability scores by chatrooms. The sorter 230 may simultaneously use the activeness score and the similarity score, or may use each of the activeness score and the similarity score individually, as a criterion for sorting the chatroom list. For example, the sorter 230 may provide each of the chatroom list that is sorted based on the activeness score and the chatroom list that is sorted based on the similarity score. As an example, the sorter 230 may sort the entire chatrooms in descending order of the probability scores, may select N chatrooms to be placed on a top of the chatroom list based on the probability scores between the chatrooms, may place the selected N chatrooms on the top of the chatroom list based on the probability scores, and may sort the remaining chatrooms based on an existing sorting criterion. Here, in terms of clustering for selecting the N chatrooms, an elbow method or the like may be used to retrieve a most optimal clustering number K. In the case of selecting the N chatrooms to be placed on the top of the chatroom list, a maximum value may be limited based on a number of chatrooms that may be viewed on a single display screen of the computer system 100. That is, a number of chatrooms to be placed on the top of the chatroom list may be determined within the maximum value. According to the existing sorting scheme, a relatively recently transmitted or received message, an unread message, and/or a message registered to favorite may be sorted on the top of the chatroom list. As another example, the sorter 230 may sort the entire chatrooms included in the chatroom list in descending order of the probability scores by chatrooms. As another example, the sorter 230 may select a desired number (a fixed number, e.g., three) of top ranking chatrooms based on the probability score and may sort the remaining chatrooms based on the existing sorting criterion. In some example embodiments, the sorter 230 may maintain the chatroom list based on the existing sorting scheme, and if a request is received from the user, may change a chatroom alignment temporarily, for example, for one minute, using at least one of the activeness score for each chatroom and contextual information.

According to example embodiments, a chatroom list may be sorted by automatically placing a chatroom that is actively used by a user or is highly likely to be used by the user based on a time and an occasion on a top of the chatroom list.

Figure 4:
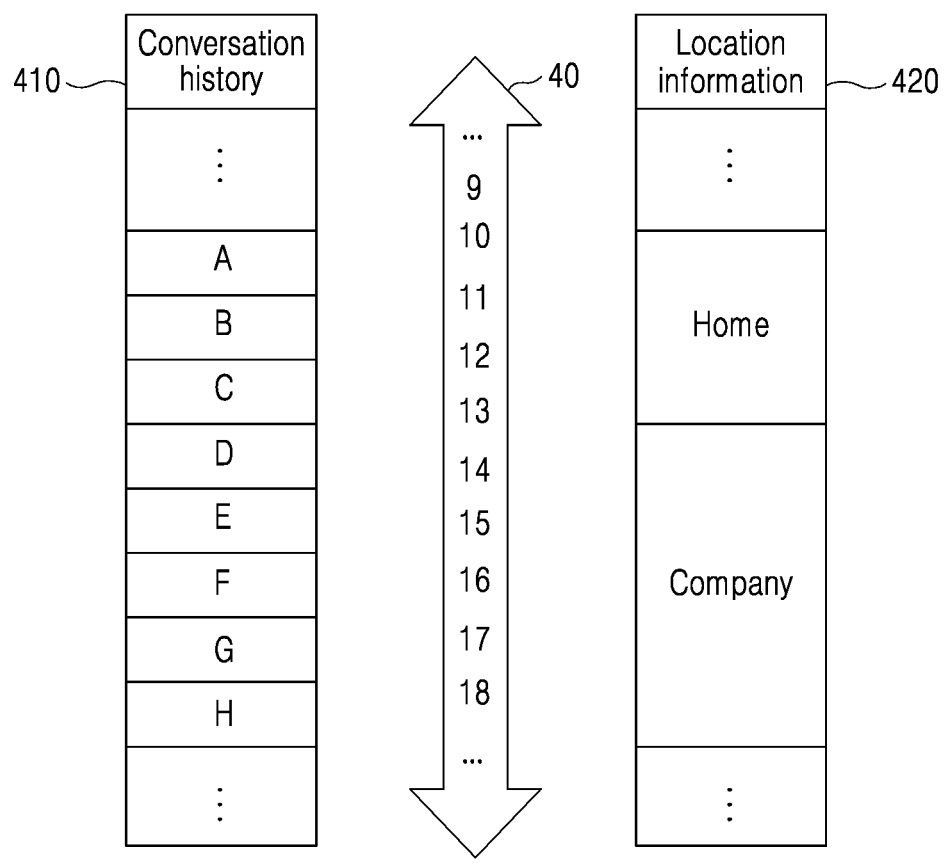
FIG. 4 illustrates an example of a process of storing contextual information of a conversation related event according to at least one example embodiment.

FIG. 4 illustrates an example of a process of storing contextual information of a conversation related event according to at least one example embodiment.

Referring to FIG. 4, a conversation database may include a chatroom timetable 410 that stores chatroom information in which a conversation related event has occurred in a temporal order 40 as a conversation history. The computer system 100 may construct a location timetable 420 as a separate database for storing a change in a location of a user recognized by a system in a temporal order 40. For example, the location timetable 420 may be constructed by recording in/out states by places based on WiFi AP information, or by recording a longitudinal value/latitudinal value periodically with respect to each conversation related event. Using the chatroom timetable 410 and the location timetable 420, chatroom information having conversation history in a specific situation (e.g., a specific time and/or a specific place) may be verified or contextual information of a corresponding point in time associated with a previous conversation history within a specific chatroom may be verified.

Hereinafter, a process of calculating an activeness score for each chatroom and a similarity score associated with contextual information is described.

The calculator 220 may calculate the activeness score using at least one of a ratio of a number of conversations of the user to a total number of conversations in an individual chatroom, a ratio of the number of conversations of the user in the individual chatroom to a total number of conversations of the user in the entire chatrooms, a ratio of a number of times a speaker is changed to a total number of conversations in the individual chatroom, a number of times the user has started a conversation after a last conversation in the individual chatroom, a number of times multimedia content has been transmitted and received in the individual chatroom, or a ratio of a number of days with conversations to a total number of days elapsed after creation of the individual chatroom.

An example of a process of calculating an activeness core for each chatroom is shown in Table 1.

TABLE 1

$Score_1$ = (number of conversations of user in chatroom/total number of conversations in chatroom) × (number of conversations of user in chatroom/total number of conversations of user in entire chatrooms) × (turn taking count in chatroom/total number of conversations in chatroom) × number of persons in chatroom
(Here, turn taking count denotes a number of times a speaker has been changed in terms of conversation order.)
$Score_2$ = number of conversation starts + number of specific conversations + (number of days with conversations/total number of days elapsed after creation of chatroom)

TABLE 1-continued (Here, number of conversation starts denotes a number of times the user has started a new conversation after a desired period of time (e.g., 1 hour) after a last conversation, and number of specific conversation denotes a number of times multimedia content (e.g., a sticker, a photo, or moving picture, has been transmitted and received.)
Activeness score = $Score_1 + Score_2$ Although it is described that the activeness score is calculated by adding up $Score_1$ and $Score_2$, it is provided as an example only. At least one of $Score_1$ and $Score_2$ may be used, and a different weight may be assigned to each of $Score_1$ and $Score_2$.

The calculator 220 may calculate the similarity score using a previous conversation history including contextual information corresponding to a current situation of the user. Here, the calculator 220 may calculate the similarity score of contextual information using at least one of a ratio of a number of conversations of the user to a total number of conversations in an individual chatroom and a ratio of the number of conversations of the user in the individual chatroom to a total number of conversations in the entire chatrooms with respect to only a conversation history made at a time or a place corresponding to a situation at a current point in time.

An example of a process of calculating a similarity score associated with contextual information is shown in Table 2.

To calculate the similarity score associated with contextual information, a current situation (e.g., time: 5:27 PM on Thursday, location home) in which chatrooms need to be sorted is recognized. A unit time, for example, one week, is divided into timeslots with a desired size. For example, if 20 minutes is used as a single timeslot, a one week is divided into a total of 504 (7 days×24 hours×3 (20 m/60 m)=504) timeslots.

Referring to Table 2, 'current timeslot' denotes a timeslot corresponding to a current time '5:27 PM Thursday' on which chatrooms need to be sorted and 'current location' denotes a current place 'home' in which chatrooms need to be sorted.

TABLE 2

$Score_3$ = (number of conversations of user in chatroom in current timeslot/total number of conversations in chatroom in current timeslot) × (number of conversations of user in chatroom in current timeslot/total number of conversations of user in entire chatrooms in current timeslot) × number of persons in chatroom
$Score_4$ = (number of conversations of user in chatroom in current place/total number of conversations in chatroom in current place) × (number of conversations of user in chatroom in current place/total number of conversations of user in entire chatrooms in current place) × number of persons in chatroom
Similarity score = $Score_3 \times Score_4$ When calculating the similarity score, a difference between a current time and each conversation time may be used instead of using a timeslot. For example, it is possible to use a previous conversation event during a time zone (e.g., from 5:12 PM to 5:42 PM) before and after '5:27 PM on Thursday' that is a current time at which chatrooms need to be sorted'.

Contextual information may be recorded based on a place (e.g., a home or a company), the user frequently visits, and the similarity score may be calculated based on a previous conversation event having occurred at a current place of the user. Here, the similarity score may be calculated based on a distance using longitude/latitude instead of using an individual place. For example, a previous conversation event within a desired radius, for example, 1 km, based on a longitudinal/latitudinal value indicating a current location of the user may be used.

In the above example, the similarity score may be calculated by multiplying $Score_3$ by $Score_4$. However, only one of $Score_3$ and $Score_4$ may be used, and a different weight may be assigned to each of $Score_3$ and $Score_4$.

The activeness score of Table 1 and the similarity score of Table 2 are provided as an example only. Other calculation schemes capable of changing features indicating activeness and/or a similarity of contextual information in a chatroom as a score may be applicable.

Figure 5:
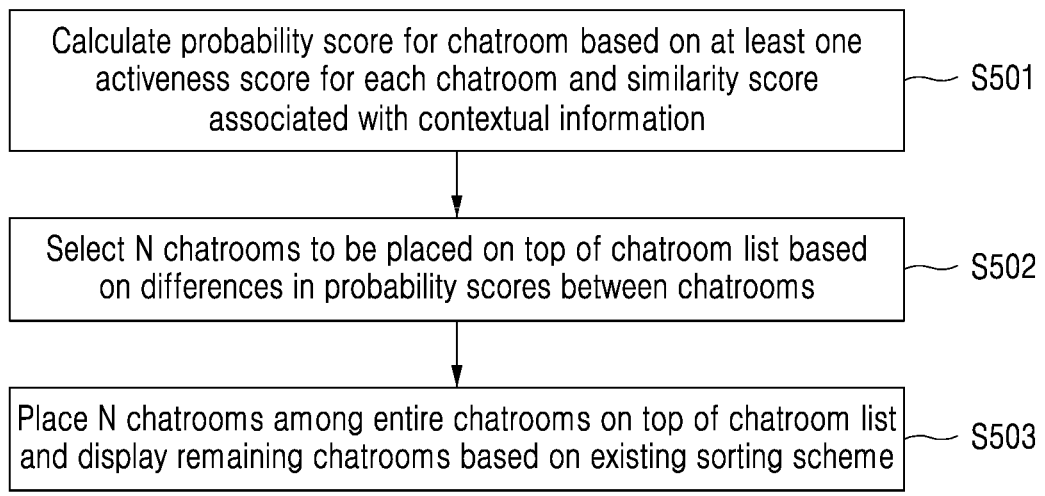
FIG. 5 is a flowchart illustrating an example of a process of sorting chatrooms according to at least one example embodiment.

FIG. 5 is a flowchart illustrating an example of a method of sorting chatrooms according to at least one example embodiment.

Referring to FIG. 5, in operation S501, the sorter 230 may calculate probability scores whether the user is currently to use a corresponding chatroom with respect to each chatroom based on at least one of an activeness score for each chatroom and a similarity score associated with contextual information. For example, the sorter 230 may calculate the probability scores by summing the activeness score of a corresponding chatroom and a similarity score associated with contextual information for each chatroom.

Figure 6:
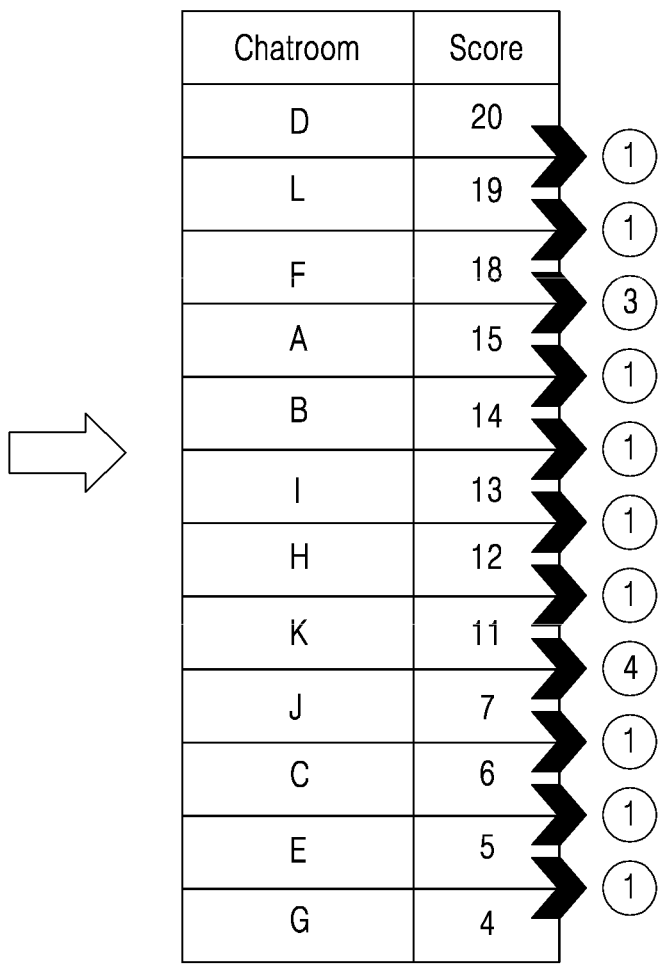
FIGS. 6 through 8 illustrate examples of a chatroom selection process based on a chatroom score distribution according to at least one example embodiment.
Figure 7:
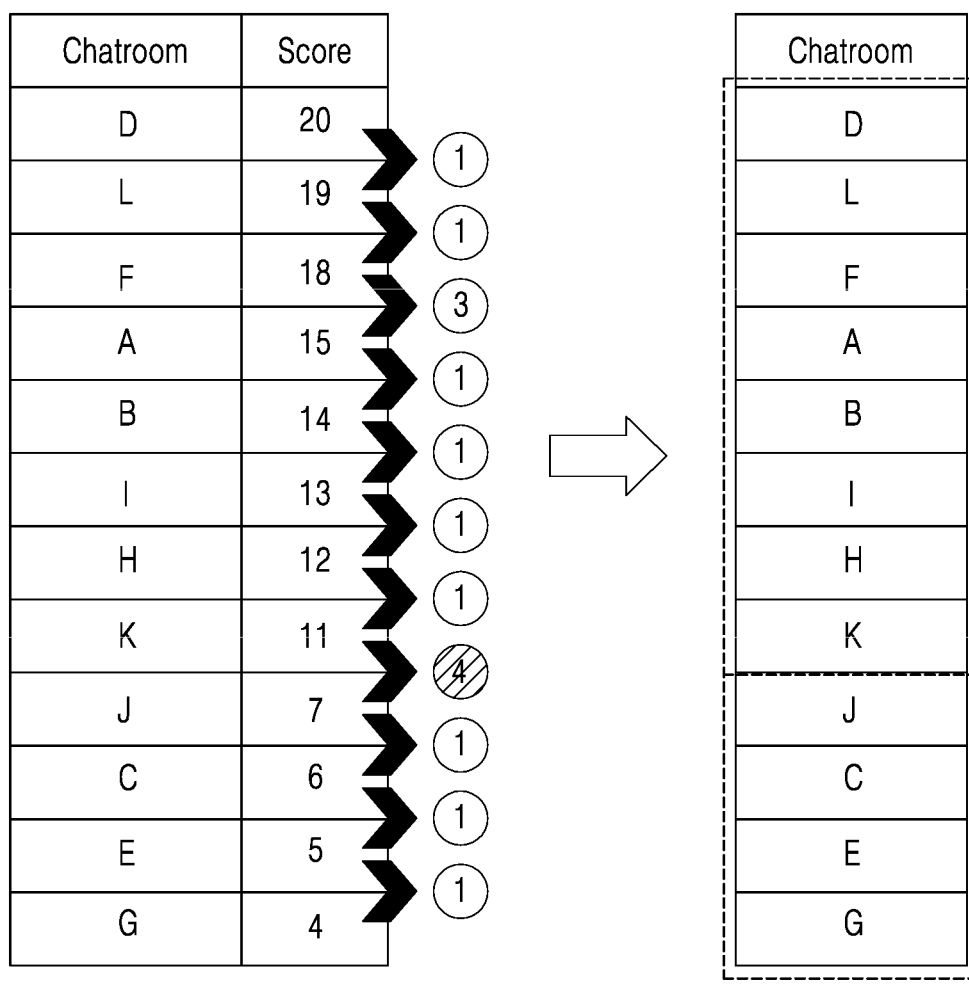
Figure 8:
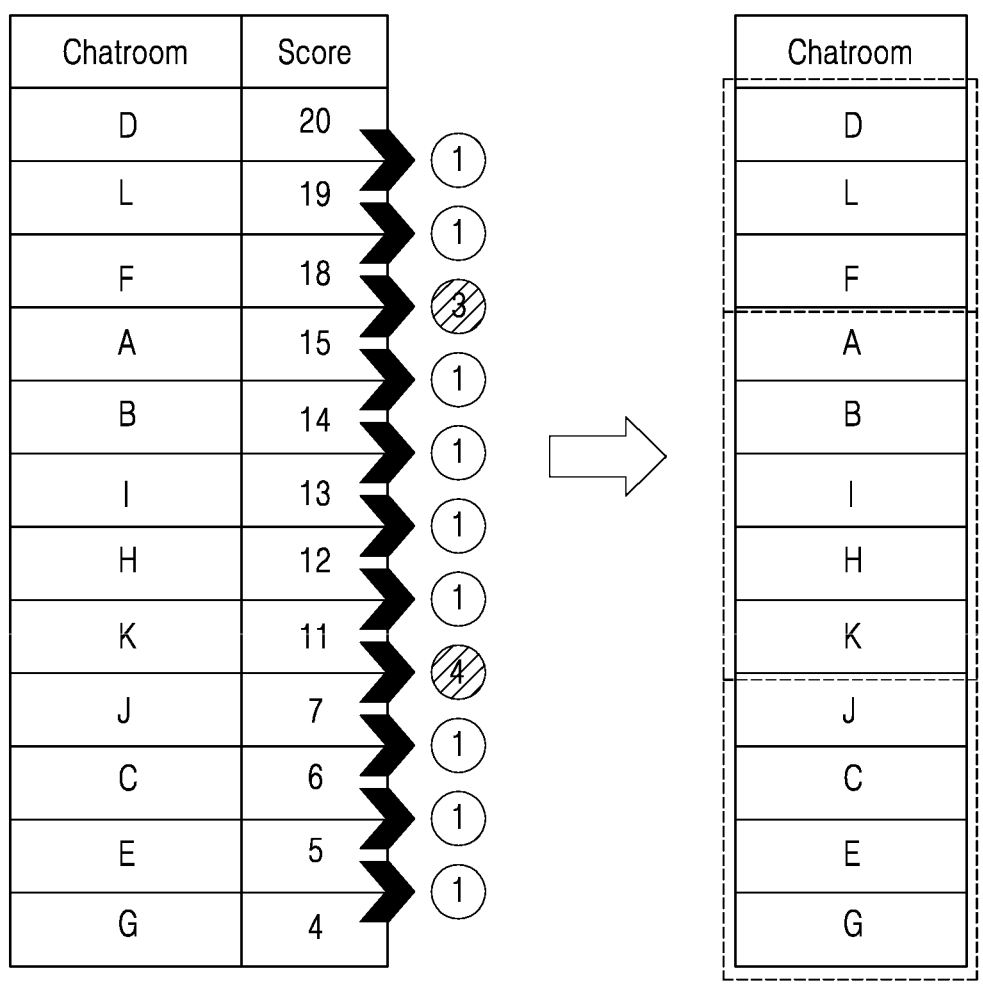

In operation S502, the sorter 230 may select N chatrooms to be placed on a top of a chatroom list based on differences in the probability scores between chatrooms. A maximum number and a minimum number of N may be determined based on a number of chatrooms that are viewed on a single screen or based on a chatroom management policy. For example, referring to FIG. 6, the sorter 230 may sort the entire chatrooms A to L in S61, and may calculate differences in probability scores between chatrooms in S62. Here, the chatrooms A to L sorted in descending order of the probability scores show score differences {1, 1, 3, 1, 1, 1, 1, 4, 1, 1, 1}. The sorter 230 may separate chatrooms in descending order of the differences in the probability scores between chatrooms through clustering. Referring to FIG. 7, in S73, a chatroom list is primarily separated based on two chatrooms (e.g., chatrooms K and J) showing a largest decrease value among the chatroom A to L sorted in descending order of the probability scores therebetween. Referring to FIG. 8, in S84, the chatroom list is secondarily separated based on two chatrooms (e.g., chatrooms F and A) showing a second largest decrease value therebetween. That is, the sorter 230 may generate a list [20, 19, 18, 15, 14, 13, 12, 11, 7, 6, 5, 4] in which probability scores by chatrooms are listed in descending order as an initial process (stage 1), may separate the list into [20, 19, 18, 15, 14, 13, 12, 11] and [7, 6, 5, 4] based on a point at which a score decrease is largest as a subsequent process (stage 2), and may separate the list into [20, 19, 18], [15, 14, 13, 12, 11], and [7, 6, 5, 4] based on a point at which a score decrease is second largest as a subsequent process (stage 3). An inter-variance/intra-variance between the separate clusters may be calculated and a maximum point or a minimum point thereof may be found. Here, if a result of a corresponding point is the third process (stage 3), N becomes 3 based on a number of chatrooms belonging to an upper group.

Referring again to FIG. 5, in operation S503, the sorter 230 may place the N chatrooms among the entire chatrooms on the top of the chatroom list, and may sort the remaining chatrooms based on the existing sorting criterion. The sorter 230 may select chatrooms D, L, and F with scores of [20, 19, 18] corresponding to the upper group in the above example, and may place the selected chatrooms D, L, and F on the top of the chatroom list. For example, the chatrooms D, L, and F placed on the top of the chatroom list may be sorted in descending order of probability scores.

Figure 9:
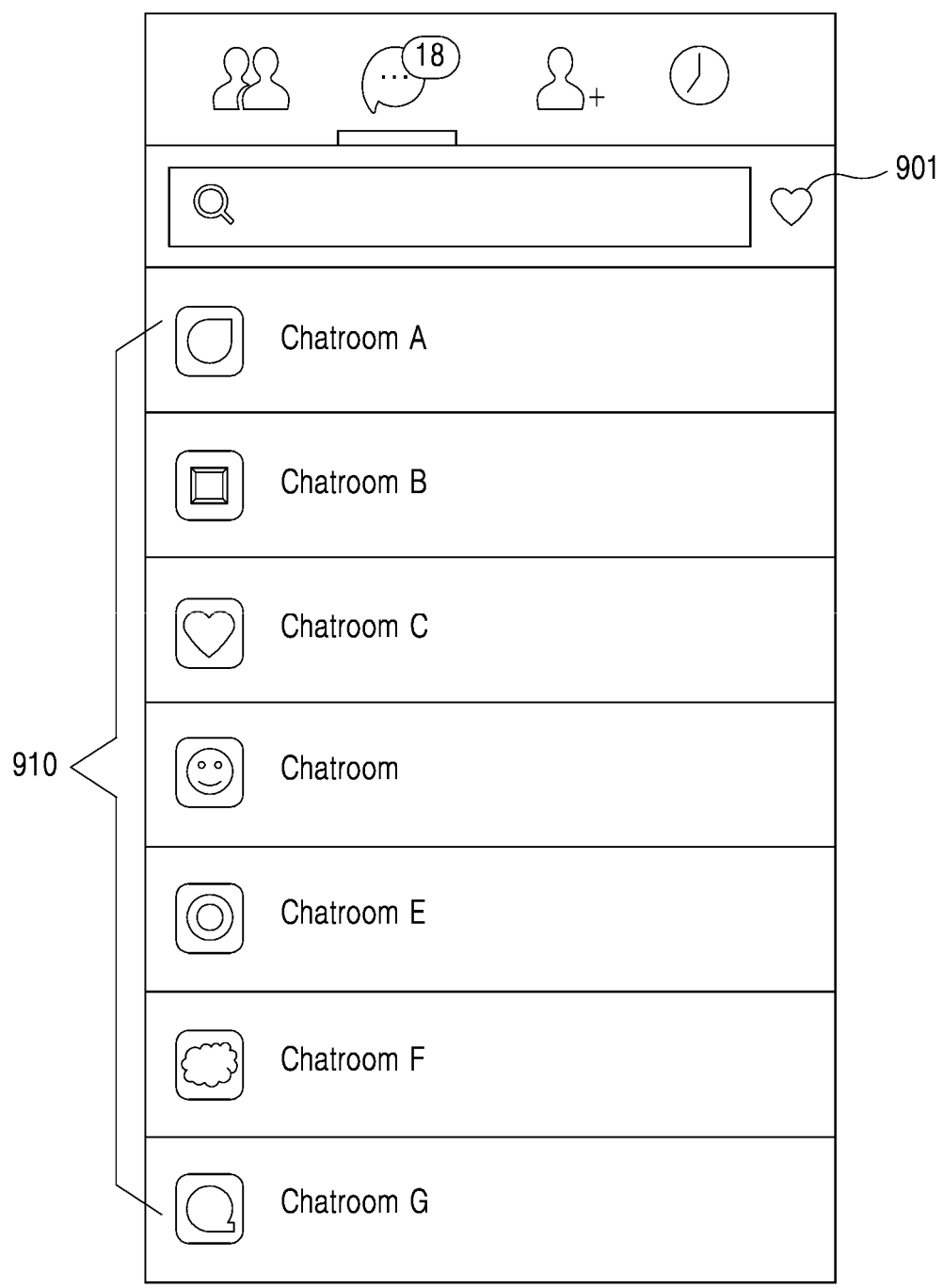
FIGS. 9 and 10 illustrate examples of a screen on which chatrooms are sorted according to at least one example embodiment.

FIG. 9 illustrates an example of a chatroom list screen 900 of a messenger according to at least one example embodiment. Referring to FIG. 9, the chatroom list screen 900 may include a chatroom list 910 in which chatrooms each in which a user exchanges messages with other users are sorted. For example, the chatroom list 910 may be sorted in descending order of a message transmission/reception time that is one of existing sorting criteria. That is, a chatroom in which the user sent or received a message at a most recent time may be placed on a top of the chatroom list 910. Here, the chatroom list screen 900 may include a 'favorite chatroom' menu 901 for separately sorting a chatroom that is actively used by the user or highly likely to be used by the user in a current situation with respect to the chatroom list 910.

Figure 10:
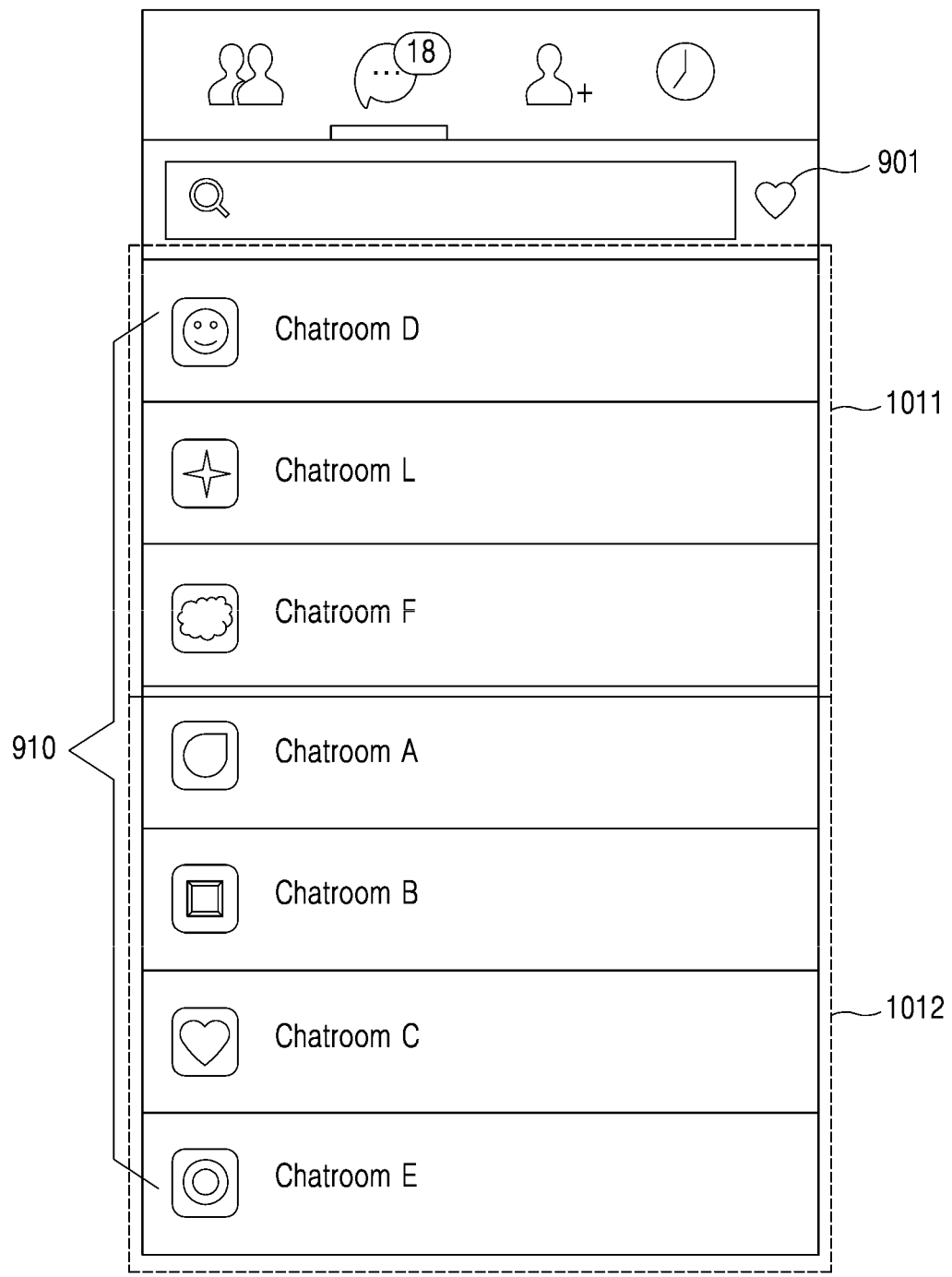

Referring to FIG. 10, if the user controls the 'favorite chatroom' menu 901 on the initial chatroom list screen 900 in which the chatrooms are sorted based on the existing sorting criterion, N chatrooms, that is, favorite chatrooms 1011 that are selected based on at least one of an activeness score for chatroom and a similarity score associated with contextual information may be sorted and displayed in descending order of probability scores, starting with a top rank of the chatroom list 910. The chatrooms D, L, and F with scores of [20, 19, 18] corresponding to the upper group described with FIGS. 5 through 8 may be sorted on a top of the chatroom list 910 as the favorite chatrooms 1011 and remaining chatrooms 1012 may be sorted below the favorite chatrooms 1011 based on an existing sorting criterion, for example, in descending order of a message transmission/reception time. In a state in which the favorite chatrooms 1011 are sorted on the top of the chatroom list 910, the user may control the 'favorite chatroom' menu 901 again or based on whether a desired period of time (e.g., 1 minute) may be elapsed. In this case, the chatroom list 910 may be restored to the existing sorting state of FIG. 9.

As another example, the chatroom list screen 900 may construct the 'favorite chatroom' menu 901 as a first menu for sorting chatrooms based on the activeness score and a second menu for sorting chatrooms based on the similarity score associated with contextual information. If the user controls the first menu on the chatroom list screen 900, a chatroom in which the user shows active actions may be sorted on the top of the chatroom list 910. If the user controls the second menu, a chatroom in which the user has made a conversation in a situation similar to a current situation (time and/or location) of the user may be sorted on the top of the chatroom list 910.

According to example embodiments, chatrooms may be automatically sorted based on a user activeness in a corresponding chatroom and contextual information associated with an action of a user. Therefore, although the user does not set a specific chatroom one by one, a chatroom that is actively used by the user or is highly likely to be used by the user based on a time and an occasion may be automatically displayed at an upper end of a chatroom list so that the user may conveniently and easily retrieve a desired chatroom and perform chatting.

The units described herein may be implemented using hardware components, software components, or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The example embodiments may be recorded in non-transitory computer-readable media including program instructions to implement various operations embodied by a computer. The media may also include, alone or in combination with the program instructions, data files, or data structures. The media and program instructions may be those specially designed and constructed for the purposes, or they may be of the kind well-known and available to those having skill in the computer software arts. Examples of non-transitory computer-readable media include magnetic media such as hard disks, floppy disks, and magnetic tape; optical media such as CD ROM disks and DVD; magneto-optical media such as floptical disks; and hardware devices that are especially configured to store and perform program instructions, such as read-only memory (ROM, random access memory (e.g., RAM, flash memory). Examples of program instructions include both machine code, such as produced by a compiler, and files containing higher level code that may be executed by the computer using an interpreter. The described hardware devices may be to act as one or more software modules in order to perform the operations of the above-described embodiments.

The foregoing description has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented chatroom sorting method comprising:
   recognizing, by one or more processors, contextual information including an event detection point in time and storing the recognized contextual information in association with a conversation related event in response to detecting the conversation related event with respect to each of chatrooms included in a chatroom list, the event detection point in time at which the conversation related event is detected;

calculating, by the one or more processors, an activeness score associated with a participation of a user into a conversation for each of the chatrooms and a similarity score between the contextual information of a situation at a current point in time and the contextual information of a situation at a previous point in time; and sorting, by the one or more processors, at least a portion of the chatrooms included in the chatroom list based on at least one of the activeness score and the similarity score such that selected one or more chatrooms from among the chatrooms are placed on top of the chatroom list based on results of the sorting.

2. The method of claim 1, wherein the storing comprises storing the contextual information that includes at least one of location information and time information at the event detection point in time.

3. The method of claim 1, wherein the storing comprises constructing a chatroom timetable and a location timetable, the chatroom timetable configured to store chatroom information associated with the detected conversation related event in temporal order, the location timetable configured to store location information of the user in temporal order as the contextual information.

4. The method of claim 1, wherein the calculating comprises calculating the activeness score using at least one of,
a ratio of a number of conversations of the user to a total number of conversations in a corresponding chatroom,
a ratio of the number of conversations of the user in the corresponding chatroom to a total number of conversations of the user in the chatrooms, and
a ratio of a number of times a speaker is changed to a total number of conversations in the corresponding chatroom.

5. The method of claim 1, wherein the calculating comprises calculating the activeness score using at least one of,
a number of times the user has started a conversation after a last conversation in a corresponding chatroom from among the chatrooms,
a number of times multimedia content has been transmitted and received in the corresponding chatroom, and
a ratio of a number of days with conversations to a total number of days elapsed after a creation of the corresponding chatroom.

6. The method of claim 1, wherein the calculating comprises calculating the similarity score using a conversation history which includes the contextual information corresponding to the situation at the current point in time for each chatroom.

7. The method of claim 1, wherein the calculating comprises calculating the similarity score using at least one of,
a ratio of a number of conversations of the user to a total number of conversations in a corresponding chatroom that are made at a time corresponding to the situation at the current point in time, and
a ratio of the number of conversations of the user in the corresponding chatroom to a total number of conversations of the user in the chatrooms that are made at the time corresponding to the situation at the current point in time.

8. The method of claim 1, wherein the calculating comprises calculating the similarity score using at least one of a ratio of a number of conversations of the user to a total number of conversations in a corresponding chatroom that are made in a place corresponding to the situation at the current point in time and a ratio of the number of conversations of the user in the corresponding chatroom to a total number of conversations of the user in the chatrooms that are made in the place corresponding to the situation at the current point in time.

9. The method of claim 1, wherein the sorting comprises:
selecting a desired number of chatrooms from among the chatrooms based on at least one of the activeness score and the similarity score; and
placing the selected desired number of chatrooms on a top of the chatroom list.

10. The method of claim 1, wherein the sorting comprises:
calculating probability scores for respective ones of the chatrooms using at least one of the activeness score and the similarity score;
selecting N chatrooms from among the chatrooms based on differences in the probability scores between the chatrooms; and
placing the N chatrooms on a top of the chatroom list and displaying remaining chatrooms excluding the N chatrooms from among the chatrooms based on an existing sorting criterion.

11. A non-transitory computer-readable recording medium storing instructions that, when executed by a processor, cause the processor to perform a chatroom sorting method comprising:
recognizing contextual information including an event detection point in time and storing the recognized contextual information in association with a conversation related event in response to detecting the conversation related event with respect to each of chatrooms included in a chatroom list, the event detection point in time being when the conversation related event is detected;
calculating an activeness score associated with a participation of a user into a conversation for each of the chatrooms and a similarity score between the contextual information of a situation at a current point in time and the contextual information of a situation at a previous point in time; and
sorting at least a portion of the chatrooms included in the chatroom list based on at least one of the activeness score and the similarity score such that selected one or more chatrooms from among the chatrooms are placed on top of the chatroom list based on results of the sorting.

12. A computer-implemented chatroom sorting system comprising:
at least one processor configured to execute computer-readable instructions,
wherein the at least one processor is configured to,
recognize contextual information including an event detection point in time and store the recognized contextual information in association with a conversation related event in response to detecting the conversation related event with respect to each of chatrooms included in a chatroom list, the event detection point in time being when the conversation related event is detected,
calculate an activeness score associated with a participation of a user into a conversation for each of the chatrooms and a similarity score between the contextual information of a situation at a current point in time and the contextual information of a situation at a previous point in time, and sort at least a portion of the chatrooms included in the chatroom list based on at least one of the activeness score and the similarity score such that selected one or more chatrooms from among the chatrooms are placed on top of the chatroom list based on results of the sorting.

13. The chatroom sorting system of claim 12, wherein the at least one processor is configured to store the contextual information that includes at least one of location information and time information at the event detection point in time.

14. The chatroom sorting system of claim 12, wherein the at least one processor is configured to calculate the activeness score using at least one of, a ratio of a number of conversations of the user to a total number of conversations in the chatroom, a ratio of the number of conversations of the user in the chatroom to a total number of conversations of the user in the chatrooms, and a ratio of a number of times a speaker is changed to a total number of conversations in the chatroom.

15. The chatroom sorting system of claim 12, wherein the at least one processor is configured to calculate the activeness score using at least one of, a number of times the user has started a conversation after a last conversation in a corresponding chatroom, a number of times multimedia content was transmitted and received in the chatroom, and a ratio of a number of days with conversations to a total number of days elapsed after the chatroom was created.

16. The chatroom sorting system of claim 12, wherein the at least one processor is configured to calculate the similarity score using a conversation history which includes the contextual information corresponding to the situation at the current point in time for each chatroom.

17. The chatroom sorting system of claim 12, wherein the at least one processor is configured to calculate the similarity score using at least one of, a ratio of a number of conversations of the user to a total number of conversations in a corresponding chatroom that are made at a time corresponding to the situation at the current point in time, and a ratio of the number of conversations of the user in the corresponding chatroom to a total number of conversations of the user in the chatrooms that are made at the time corresponding to the situation at the current point in time.

18. The chatroom sorting system of claim 12, wherein the at least one processor is configured to calculate the similarity score using at least one of a ratio of, a number of conversations of the user to a total number of conversations in a corresponding chatroom that are made in a place corresponding to the situation at the current point in time, and a ratio of the number of conversations of the user in the corresponding chatroom to a total number of conversations of the user in the chatrooms that are made in the place corresponding to the situation at the current point in time.

19. The chatroom sorting system of claim 12, wherein the at least one processor is configured to select a desired number of chatrooms from among the chatrooms based on at least one of the activeness score and the similarity score and place the selected desired number of chatrooms on a top of the chatroom list.

20. The chatroom sorting system of claim 12, wherein the at least one processor is configured to, calculate probability scores for respective ones of the chatrooms using at least one of the activeness score and the similarity score, select N chatrooms from among the chatrooms based on differences in the probability scores between the chatrooms, and place the N chatrooms on a top of the chatroom list and display remaining chatrooms excluding the N chatrooms from among the chatrooms based on an existing sorting criterion.

21. The method of claim 1, further comprising:

calculating probability scores of respective ones of the chatrooms based on at least one of the activeness score for each of the chatrooms and the similarity score associated with the contextual information;

selecting N chatrooms among the chatrooms to be placed on a top of the chatroom list based on differences in the probability scores between the chatrooms, where N is a natural number; and placing the N chatrooms among the chatrooms on the top of the chatroom list.

* * * * *